United States Patent [19]

Cincera et al.

[11] 3,903,200

[45] Sept. 2, 1975

[54] CONTINUOUS MASS POLYMERIZATION PROCESS FOR ABS POLYMERIC POLYBLENDS

[75] Inventors: David L. Cincera, East Longmeadow; William O. Dalton, Hampden; Michael B. Jastrzebski, Ware; Charles E. Wyman, South Hadley, all of Mass.

[73] Assignee: Monsanto Company, St. Louis, Mo.

[22] Filed: Mar. 7, 1974

[21] Appl. No.: 448,844

[52] U.S. Cl.......... 260/876 R; 260/878; 260/880 R; 260/DIG. 28; 260/45.85
[51] Int. Cl.² .................. C08L 51/00; C08L 53/00
[58] Field of Search ..................... 260/876 R, 880 R

[56] References Cited
UNITED STATES PATENTS

| | | | |
|---|---|---|---|
| 3,509,237 | 4/1970 | Aubrey | 260/880 R |
| 3,581,014 | 11/1974 | Dalton | 260/876 R |
| 3,663,656 | 5/1972 | Ford | 260/880 R |

*Primary Examiner*—Paul Liberman
*Attorney, Agent, or Firm*—Joseph S. Nelson; Edward P. Grattan; James C. Logomasini

[57] ABSTRACT

This invention relates to a process for the continuous mass polymerization of a monomer formulation comprising at least principally of a monoalkenylaromatic monomer and an ethylenically unsaturated nitrile monomer having dispersed therein a first grafted diene rubber to form a first partially polymerized mixture; dispersing a second grafted rubber in said first mixture forming a second partially polymerized mixture and polymerizing said second mixture to form a third partially polymerized mixture followed by devolatilization said third mixture to form a polyblend of the polymer of said monomer and said dispersed grafted diene rubber having a bimodal particle size distribution.

29 Claims, No Drawings

CONTINUOUS MASS POLYMERIZATION PROCESS FOR ABS POLYMERIC POLYBLENDS

BACKGROUND OF THE INVENTION

As is well known, polyblends of rubber with styrene/acrylonitrile polymers have significant advantages in providing compositions of desirable resistance to impact for many applications. Various processes have been suggested or utilized for the manufacture of such polyblends including emulsion, suspension and mass polymerization techniques, and combinations thereof. Although graft blends of a monoalkenyl aromatic and ethylenically unsaturated nitrile monomers and rubber prepared in mass exhibit desirable properties, this technique has a practical limitation upon the maximum degree of conversion of monomers to polymer which can be effected because of the high viscosities and accompanying power and equipment requirements, which are encountered when the reactions are carried beyond a fairly low degree of conversion after phase inversion takes place. As a result, techniques have been adopted wherein the initial polymerization is carried out in mass to a point of conversion beyond phase inversion at which the viscosity levels are still of practical magnitudes, after which the resulting prepolymerization syrup is suspended in water or other inert liquid and polymerization of the monomers carried to substantial completion.

N. E. Aubrey in U.S. Pat. No. 3,509,237 discloses a mass/suspension method of polymerization styrene/acrylonitrile having diene rubbers dissolved therein with the rubber being grafted, inverted and dispersed as rubber particles under agitation. After phase inversion, the viscous mixture is suspended in water and polymerization is completed producing a polyblend in the form of beads.

Such mass/suspension processes are used commercially, however, present the economic problems of batch operations requiring long cycles at relatively low temperatures to control the heat of polymerization. Continuous mass polymerization processes have great economic advantages if then can be run at higher temperatures and higher rates with the necessary control of the great heats of polymerization. In the case of polyblends, the dispersed rubber phase must be formed and stabilized as to its morphology bringing it through the continuous polymerization of the rigid matrix polymer phase so that the physical properties of the polyblend meet exacting property specifications.

Various methods have been developed for the continuous mass polymerization of polyblends. Ruffing et.al. in U.S. Pat. No. 3,243,481 disclose a process wherein diene rubbers are dissolved in predominantly monovinylidene aromatic monomers and polymerized in four reaction zones. Such processes require physically separated reactors providing different reacting conditions for each step of polymerization involving costly multiple reactors and specialized equipment.

Bronstert et.al. disclose in U.S. Pat. No. 3,658,946 a similar process wherein the prepolymerization step is run to a solids content of no more than 16% to provide a rubber particle having a particular structure. Bronstert et.al. disclose a need for separated nonstirred downstream reactors for final polymerization each providing a particular set of reacting conditions to insure final properties for the polyblend.

Okasaka et.al. disclose in U.S. Pat. No. 3,751,526 a process for producing rubber modified thermoplastic resins by extracting a grafted diene rubber from a latex into a styrene-acrylonitrile monomer phase, separating the monomer-rubber phase from the water phase and mass polymerizing the monomer-rubber phase to provide a polyblend of styrene/acrylonitrile polymer only a single grafted rubber phase of one particle size.

N. E. Aubrey in U.S. Pat. No. 3,509,237 further discloses a process for preparing styrene/acrylonitrile/rubber polyblends having a first and second grafted rubber phase wherein the first grafted rubber has a large particle size and the second grafted rubber has a smaller particle size. Such polyblends have superior properties if the smaller particle size rubber phase constitutes the largest proportion of the total rubber phase. A process for making such polyblends is disclosed wherein the two grafted rubber polyblends are prepared in batch processes separately and thereafter melt blended mechanically to form a polyblend having a first and second grafted rubber phase.

Accordingly, it is an objective of the present invention to provide a continuous polymerization process that will produce rubber modified ABS type polymeric polyblends having a matrix polymer phase of predetermined average molecular weight and molecular weight distribution.

Another objective of this invention is to provide a continuous polymerization process for producing ABS type polyblends having first and second grafted rubber phase particles of predetermined morphology dispersed in the matrix polymer phase.

Another objective of this invention is to provide a continuous mass polymerization process with the necessary heat control using only two reaction zones minimizing the need for a three or more reaction zones with extended conversion cycles and costly process equipment, or the need for batch operations in preparing polyblends having two rubber phases having different morphology and in particular, a bimodal distribution for the rubber particles.

SUMMARY OF THE INVENTION

It has now been found that the foregoing and related objectives and their advantages may be readily attained by the present invention which relates to a continuous mass polymerization process for preparing a polymeric polyblend, the steps comprising:

A. continuously mass polymerizing monomers containing 0.1 to 15% by weight of a soluble diene rubber so as to convert 10 to 40% of said monomers to a polymer of said monomers, graft at least a portion of said polymer on said diene rubber and disperse said rubber as a first grafted diene rubber in a monomerpolymer phase, to provide a first partially polymerized mixture, said monomer formulation comprising at least principally a monoalkenylaromatic monomer and an ethylenically unsaturated nitrile monomer, said first grafted diene rubber being dispersed as rubber-monomer particles having an average particle size of 0.7 to 10 microns and having present occluded and grafted polymer;

B. continuously withdrawing said first partially polymerized mixture from step (A);

C. continuously dispersing a second grafted diene rubber into said first partially polymerized mixture, said second grafted rubber comprising crosslinked rubber particles having a swelling index of at least 2, an average particle size of 0.01 to 0.5 microns and being grafted with about 0.1 to 2.5 parts of said monomer formulation per 1 part of rubber forming a second partially polymerized mixture containing 1 to 30 weight percent of said first and second grafted diene rubbers wherein the second grafted rubber comprises from about 50 to 97% of the total weight of said first and second grafted diene rubbers;

D. continuously mass polymerizing said second partially polymerized mixture until the polymerization of said monomer formulation has reached a conversion of about 25 to 80% to provide a third partially polymerized mixture;

E. continuously devolatilizing said third partially polymerized mixture to provide a polymeric polyblend comprising about 2 to 40% by weight of said first and second grafted diene rubbers wherein said second grafted diene rubber comprises about 50 to 97% of the total weight of said first and second grafted diene rubbers, the remainder up to 100%, being polymer of said monomer formulation, said first grafted diene rubbers being dispersed as rubber particles having an average particle size of 0.7 to 10 microns, a swelling index of at least 5 and having present occluded and grafted polymer in an amount of about 1 to 5 parts per each part of rubber.

DETAILED DESCRIPTION

The Monomer Formulation

The monomer formulation comprises, at least principally, a monoalkenylaromatic monomer and a ethylenically unsaturated nitrile monomer. The monoalkenylaromatic monomer comprises at least one monomer of the formula:

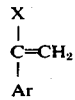

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

Exemplary of the unsaturated nitriles which may be used in the interpolymers are acrylonitrile, methacrylonitrile, ethacrylonitrile, and mixtures thereof.

Exemplary of the monomers which may be interpolymerized with the monoalkenylaromatic hydrocarbons and unsaturated nitriles are conjugated 1,3 dienes, e.g. butadiene, isoprene, etc.; alpha- or beta-unsaturated mono-basic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylaminde; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer or a partially polymerized material such as a partially polymerized monoalkenylaromatic hydrocarbon or interpolymer thereof.

The polymerizable monomer mixtures contain at least 20 percent by weight of the monoalkenylaromatic monomer and preferable at least 50 percent by weight thereof. They also contain at least 5 percent by weight of the unsaturated nitrile and preferably at least 10 percent by weight thereof. From the standpoint of highly advantageous commercial practice, the monomer formulations contain 20 to 95 percent, and preferably 60 to 85 percent, by weight of the vinylidene aromatic hydrocarbon and 80 to 5 percent, and preferably 40 to 15 percent, by weight of the unsaturated nitrile.

In addition to the monomers to be polymerized, the formulation can contain catalyst where required and other desirable components such as stabilizers, molecular weight regulators, etc.

The polymerization may be initiated by thermal monomeric free radicals, however, any free radical generating catalyst may be used in the practice of this invention including actinic irradiation. Conventional monomer-soluble peroxy and perazo catalysts may be used. Exemplary catalysts are di-tert-butyl peroxide, benzoyl peroxide, lauroyl peroxide, eleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-di(tert-butylperoxy) hexane, 2,5-dimethyl-2,5-di(tert-butylperoxy) hexane-3 or hexyne-3, tert-butyl hydroperoxide, cumene hydroperoxide, p-menthane hydroperoxide, cyclopentane hydroperoxide, pinane hydroperoxide, 2,5-dimethylhexane-2,5-dihydroperoxide, etc., and mixtures thereof.

The catalyst is generally included within the range of 0.001 to 3.0 percent by weight, and preferably on the order of 0.005 to 1.0 percent by weight of the polymerizable material, depending primarily upon the monomer present.

As is well known, it is often desirable to incorporate molecular weight regulators such as mercaptans, halides and terpenes in relatively small percentages by weight, on the order of 0.001 to 1.0 percent by weight of the polymerizable material. From 2 to 20% diluents such as ethylbenzene, ethyltoluene, ethylxylene, diethylbenzene or benzene may be added to the monomer composition to control viscosities at high conversions and also provide some molecular weight regulation. In addition, it may be desirable to include relatively small amounts of antioxidants or stabilizers such as the conventional alkylated phenols. Alternatively, there may be added during or after polymerization. The formulation may also contain other additives such as plasticizers, lubricants, colorants and non-reactive preformed polymeric materials which are suitable or dispersible therein.

The Diene Rubber

The preferred rubbers are diene rubbers, including mixtures of diene rubbers, i.e. any rubbery polymer (a rubbery polymer having a second order transition temperature not higher than 0° centigrade, preferably not higher than −20° centigrade, as determined by ASTM Test D-746-52T) of one or more of the conjugated, 1,3-dienes, e.g. butadiene, isoprene, 2-chloro-1,3 butadiene, 1 chloro-1,3 butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl - 4 - chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and vinylidene chlories and bromides, etc.); and the like.

A preferred group of rubbers are the stereospecific polybutadiene rubbers formed by the polymerization of 1,3 butadiene. These rubbers have a cis-isomer content of about 30–98% and a trans-isomer content of about 70–2% and generally contain at least about 85% of polybutadiene formed by 1,4-addition with no more than about 15% by 1,2 addition. Mooney viscosities of the rubber (ML-4, 212°F.) can range from about 20 to 70 with a second order transition temperature of from about −50°C. to −105°C. as determined by ASTM Test D-746-52T.

The diene rubber used in preparing the first grafted diene rubber of step (A) is a soluble diene rubber of the type described above. The stereospecific polybutadiene rubbers are the most preferred for optimum physical properties of the polyblend.

The diene rubbers used in the second grafted rubber is of the type described above. A preferred group of rubbers are those consisting essentially of 75 to 100 percent by weight of butadiene and/or isoprene and up to 25 percent by weight of a monomer selected from the group consisting of monovinylidene aromatic hydrocarbons (e.g. styrene) and unsaturated nitriles (e.g. acrylonitrile), or mixtures thereof. Particularly advantageous substrates are butadiene homopolymer or an interpolymer of 90 to 95 percent by weight butadiene and 5 to 10 percent by weight of acrylonitrile or styrene. The diene rubber may contain up to about 2 percent of a crosslinking agent based on the weight of the rubber monomer or monomers. The crosslinking agent can be any of the agents conventionally employed for crosslinking diene rubbers, e.g. divinylbenzene, diallyl maleate, diallyl fumarate diallyl adipate, allyl acrylate, allyl methacrylate, diacrylates and dimethacrylates of polyhydric alcohols, e.g. ethylene glycol dimethacrylate, etc.

CONTINUOUS MASS POLYMERIZATION - STEP A

A monomer formulation comprising at least principally a monoalkenyl aromatic monomer and an ethylenically unsaturated nitrile monomer having about 0.1 to 15% by weight of a diene rubber dissolved therein is charged continuously as a monomer-rubber solution to the initial reaction zone. The monomers are polymerized at temperatures of about 100°–150°C. in the first zone converting about 10–40% by weight of the monomers to a polymer as a first polymer. At least a portion of the first polymer polymerized is grafted as polymer molecules to the diene rubber as a superstrate.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

The remainder of the first polymer formed is dissolved in said monomer composition as polymerized forming a monomerpolymer solution. The monomer-polymer solution or phase is incompatible with the monomer-rubber solution or phase and phase separation is observed by the well known Dobry effect. As the polymer concentration of the monomer polymer-phase increases and has a volume slightly larger than the monomer-rubber phase, the monomer-rubber phase disperses as rubber-monomer particles aided by the shearing agitation of the stirred first reaction zone.

The agitation must be sufficient and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.7 to 10 microns preferably from 0.7 to 5 microns to provide a balance between the impact strength and the gloss of the rubber reinforced polyblend. Higher stirring rates and shearing agitation can lower the size of the dispersed rubber particle, hence must be controlled to provide sufficient stirring to size the particles to the predetermined size needed and insure homogeneous dispersion.

At steady state polymerization, in the initial polymerization zone, the continuously charged monomer composition containing 0.1 to 15% by weight diene rubber disperses almost instantaneously, under stirring, forming the rubber-monomer particles which on complete polymerization form discrete rubber particles. The conversion of monomers to polymers in the first reaction zone is controlled between 10–40% and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with a first polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 5 parts for each part of said diene rubber.

The dispersed rubber phase increases the toughness of the ABS type polymeric polyblend as measured by its Izod impact strength by Test ASTM D-256-56. It has been found that the impact strength of polyblends increase with the weight percent rubber dispersed in the polyblend as used in the present invention. The impact strength is also determined by the size of the dispersed rubber particles, with the larger particles providing higher impact strength in the range of 0.7 to 10 microns measured as a weight average particle size diameter with a photosedimentometer by the published procedure of Graves, M. J. et.al., "Size Analysis of Subsieve Powders Using a Centrifugal Photosedimentometer," British Chemical Engineering 9:742–744 (1964). A Model 3000 Particle Size Analyzer from Martin Sweets Co., 3131 West Market Street, Louisville, Ky. was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.7 to 10 microns can be used for the large particles with the range of 0.7 to 5 microns being preferred and 0.8 to 3 microns being most preferred for optimum impact strength and gloss.

The small particles in the polyblend can range from 0.01 to 0.50 microns in diameter on a weight average basis as determined by the photosedimentometer test described for the large rubber particles. Preferably the range is 0.05 to 0.40, and most preferably from 0.1 to 0.3 microns in diameter on a weight average basis. The larger first grafted rubber particles are formed in step (A) and the smaller second grafted rubber particles are added in step (C) to give a bimodal distribution of large and small providing a good balance of impact strength and gloss for the ABS polyblend. The optimum bimodal distribution has been found to have from about 50 to 97% by weight of the total rubber phase as small second grafted diene rubber particles and the remainder up to 100% being the larger first grafted rubber particles.

Processwise, in the initial reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial reaction zone and throughout the total polymerization process. The rubber particle is also grafted externally stabilizing its structure as to size and its dispersability in the monomer-polymer phase. The initial reactor forms a first partially polymerized mixture of a monomerpolymer phase having the rubber phase described dispersed therein.

THE SECOND GRAFTED DIENE RUBBER

Emulsion polymerization is preferred over mass or suspension polymerization for polymerizing rubber monomers for the second grafted diene rubber since such will provide a small particle size distribution which is preferred for use in the present invention. Furthermore, emulsion polymerization of rubber monomers produces a latex which is useful as a base or starting point for subsequent emulsion polymerization of the superstrate monomers onto the preformed rubber in the preparation of the second grafted diene rubber.

The second grafted rubber may be prepared by polymerizing superstrate monomers in the presence of the preformed rubber substrate, generally in accordance with conventional emulsion grafted polymerization techniques. The preferred processes use an emulsion technique to obtain the particle size of not more than about 0.5 microns for the graft copolymer which is preferred for use in the practice of the present invention. In such graft polymerization, a preformed rubber substrate generally is dissolved or dispersed in the monomers, and this admixture is polymerized to combine chemically or graft a portion of the superstrate monomers upon the rubber substrate. Depending upon the ratio of monomers to rubber substrate and polymerization conditions, it is possible to regulate both the desired degree of grafting of the superstrate monomers onto the rubber substrate and the polymerization of ungrafted matrix copolymer. The ratio of monomers to rubber charged to the graft polymerization reaction zone in a primary determinant of the superstrate:substrate ratio of the resultant graft copolymer, although conditions of polymerization, rubber chemistry and particle size, rates of monomer addition, chain transfer agents, etc., may also exert an effect.

A polymerization catalyst is generally included and the amount used is generally within the range of from about 0.001 to 3.0 weight percent, and preferably from about 0.005 to 0.5 weight percent of the total polymerizable material, the exact amount depending upon the monomers and the desired polymerization cycle.

As is well known, it is often desirable to incorporate molecular weight regulators such as mercaptans, halides and terpenes in relatively small percentages by weight, on the order of from about 0.001 to 2.5 percent by weight of the polymerizable material. In addition, it may be desirable to include relatively small amounts of antioxidants or stabilizers, such as the conventional alkylated phenols and the like, although these may be added during or after polymerization.

In the emulsion polymerization grafting process, the monomers and rubber substrate are emulsified in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents which have proven particularly advantageous are ammonium oleate, sodium palmitate, sodium stearate, and other sodium soaps. Generally, the emulsifying agent is provided in amounts of from about 0.1 to 15 parts by weight per 100 parts by weight of the monomers, and water is provided in an amount of from about 1 to 4 parts per part of monomers, and even in larger ratios where greater dilution is desirable, all as those skilled in the art appreciate.

If desired, an aqueous latex formed in the emulsion polymerization of the rubber substrate may provide the aqueous medium onto which the monomers are grafted, with or without the addition of further emulsifying agents, water, and the like. However, the rubber may be dissolved in the monomers, and the mixture emulsified, or a latex thereof may be separately prepared. Various water soluble free radical polymerization initiators are conventionally used for emulsion polymerization of the rubber monomer, including conventional peroxy-and azo-catalysts, and the resulting latex may be used as the aqueous medium in which the graft copolymer monomers are admixed. In this manner, the catalyst for the rubber polymerization may function in whole or part as the catalyst for the graft polymerization. However, additional catalysts may be added at the time of graft polymerization.

Typical emulsion polymerization conditions involve temperatures in the range of from about 20° to 100°C. with agitation, and preferably in inert atmosphere. Pressures of from about 1 to 100 pounds per square inch may be employed, and monomers and/or additional catalysts may be added incrementally or continuously over a portion of the reaction cycle. Polymerization is preferably continued until substantially all, that is more than 90 percent, of the monomers have polymerized. The remaining monomers and other volatile components are then distilled away from the latex, preferably, which is then ready for further treatment.

Particle size of the emulsion latex graft particles may be varied by seeding, emulsifying agent concentration, agitation, rubber size variation through agglomeration prior to grafting, coagulation techniques, etc. Preferred agglomeration procedures are provided by Dalton's U.S. Pat. No. 3,558,541 and U.S. Pat. No. 3,551,370.

The particle size of the rubber has an effect upon the optimum grafting level for a graft copolymer. For example, a given weight percentage of smaller size rubber particles will provide considerably higher surface area for grafting than the equivalent weight of a larger size rubber particle. Accordingly, the density of grafting can be varied depending upon the size of the rubber particle. Generally, smaller graft polymer particles will tolerate a higher superstrate/substrate ratio than larger size particles.

The particle size of the rubber graft copolymer has a significant effect upon the gloss and physical properties of the product produced by the processes of this invention. Typically, the particle size of the graft copolymers used in the practice of the present invention may be varied from as little as about 0.01 microns to as large as about 0.5 microns, and preferably from about 0.05 to 0.40 microns, depending upon the ultimate properties desired for a given product. A most preferred rubber graft copolymer for use in the practice of this invention are graft copolymers having a weight average particle size of from about 0.1 to 0.3 microns for the second grafted rubber.

For emulsion polymerization processes, the rubber desirably has a significant degree of crosslinking. With respect to the graft copolymers, at least some degree of crosslinking is inherent during the graft polymerization process, and this desirably may be augmented through the addition of crosslinking agents or control of the polymerization conditions.

DEWATERING OF THE SECOND GRAFTED RUBBER LATEX

The latex containing the second grafted diene rubber can be coagulated, filtering off the rubber, followed by washing and drying to a crumb by conventional rubber latex dewatering methods. The crumb is then dispersed in the first partially polymerized mixture in step (C). The crumb is a loose agglomerate of crosslinked and graftd particles that are readily dispersed as discrete particles in the monomer phase of the first partially polymerized mixture. Such crumb can be dispersed in said monomers alone up to about 40% by weight based on said monomers to form a slurry with the monomers that can be fed to the first partially polymerized mixture readily by pumping. Preferably the slurry monomer composition used has at least about 50% by weight of ethylenically unsaturated nitrile monomers in combination with the monovinyl aromatic monomers. In the operation of the process the evaporated monomers from the second reactor can be condensed, cooled and used as the slurry monomers keeping the material balance of the process in balance.

The conventional method of coagulating, filtering, washing and drying requires a multistage process with costly equipment and operations. A preferred method of dewatering is described herewith. The graft rubber copolymer latex containing the second grafted rubber is mixed with a mixed monomer and solvent extractant for the polymers. The mixing may be accomplished in any form and order of addition so long as the extractant and latex are thoroughly interdispersed. Preferably, such mixing should be accomplished at relatively low shear rates. The monomer and solvent mixture comprises at least one monoalkenyl aromatic or ethylenically unsaturated nitrile monomer and at least one saturated, i.e. no unsaturated carbon atoms, solvent for the monoalkenylaromatic/ethylenically unsaturated nitrile graft copolymer superstrate and ungrafted copolymer. The mixed extractant contains at least about 5 percent by weight of such saturated solvent based on the total weight of such solvent plus monomers. Furthermore, to insure good water separation the monomer-solvent mixture can contain not more than 50 percent by weight of the monoalkylaromatic monomer such as styrene. The extractant nitrile-monomer-solvent mixture is used in an amount of from 20 to 200 parts of saturated solvent plus monomer per hundred parts of latex solids by weight. Hence, if a monoalkylaromatic monomer such as styrene is present the total monomer-solvent mixture added to and mixed with the graft rubber latex can range from 20 to 400 parts per hundred parts of latex solids by weight.

The monoethylenically unsaturated monomers useful in the monomer-solvent mixture are of the two general classes described above. When a typical ABS resin wherein the matrix resin is comprised of an acrylonitrile-styrene copolymer is desired then the most preferred monomers in the mixture are styrene and acrylonitrile. However, other monoalkenylaromatic monomers can be used in whole or in part in place of styrene, such as alphamethyl styrene, alpha-ethyl styrene, vinyl naphthalene and the like. Likewise, other monomers can be used in whole or in part in place of acrylonitrile, such as methacrylonitrile, 2-butenenitrile, 3-butenenitrile and the like. These monomers if employed, in the monomer-solvent mixture will be present in the matrix resin as comonomers in the matrix copolymer. Since ABS resins are overwhelmingly composed of acrylonitrile-styrene copolymer matrices these monomers are the preferred ones of choice for use in the monomer-solvent mixture for extracting the graft rubber latices, and in this specification the present invention will be described in terms of styrene and acrylonitrile monomers. It is to be understood, however, that the above monomers can also be used if desired.

The saturated solvent used in the monomer-solvent mixture can be any such saturated solvent boiling between about 25° and 250°C. at atmospheric pressure and preferably between about 35° and 180°C. which is a solvent for the graft rubber copolymer superstrate. Preferably, such a solvent is both a good solvent for the styrene/acrylonitrile copolymer superstrate while at the same time a relatively poor solvent or non-solvent for the alkadiene rubber substrate. Saturated solvents for the graft copolymer superstrate meeting the above criteria include nitriles such as acetonitrile, propionitrile, butyronitrile, methoxy propionitrile, benzonitrile, isobutyronitrile, acetone, cyanohydrin and the like, ketones such as acetone, methyl ethyl ketone, methyl propyl ketone, methyl isobutylketone, cyclohexanone and the like, lower carboxylic esters such as methyl acetate, ethyl acetate, butyl acetate, Cellosolve acetate, and the like, formamides and acetamides such as dimethylformamide, diethylformamide, dimethylacetamide, and the like. The preferred saturated solvents are those selected from the nitriles and ketones detailed above, which represent the best balance of solvent and non-solvent properties respectively for the copolymer superstrate and alkadiene rubber substrate.

Dewatering is obtained when the monomer-solvent mixture contains at least 5 percent by weight of said mixture of at least one of the saturated SAN copolymer solvents. Preferably, such monomer-solvent mixture will contain from about 10 to about 40 percent by weight of such solvent. Most preferably, the solvent can range from about 20 to about 35 percent by weight.

Generally, when a considerable portion of the most preferred monomers are present in the monomer-solvent mixture used, the graft rubber particle in the latex will be coagulated immediately or upon thorough mixing of the latex with the monomer-solvent mixture. However, it is usually preferred to speed up and insure completeness of such coagulation of the latex. This can be accomplished by gentle heating of the latex and monomer-solvent mixture or preferably by the addition thereto of known latex coagulants. Such coagulants found suitable include acids such as formic acid, acetic acid, propionic acid, acrylic and methacrylic acid, sulfuric acid and hydrochloric acid, salts such as aluminum sulfate, aluminum nitrate, sodium chloride, calcium nitrate, magnesium sulfate, lead nitrate and lead acetate, and polyelectrolytes such as polyethylene oxide of high molecular weight, polyacrylic acid, polyacrylates and polymethacrylates, polymethylene glycols of high molecular weight such as polyethylene glycol 3000 and the like as well as alginates and other natural polymers known as latex coagulants. The most preferred are those coagulants which are most completely removed upon separation and removal of the water from the latex.

The mixing of the monomer-solvent mixture and the graft rubber latex generally results in a rapid extraction of the graft rubber particles into the monomer-solvent mixture and an accompanying separation of the major proportion of the water present in the latex or added with any coagulant used. The use of a coagulant aids in achieving the most complete separation of this water into a separate phase. The graft rubber copolymer particles as well as any ungrafted SAN copolymer present in the latex is rapidly taken up into the monomer-solvent mixture phase wherein the graft rubber particles are present as a dispersion. In order to achieve rapid formation of the dispersed graft rubber in monomer-solvent mixture phase, an amount of monomer-mixture of from about 30 to 400 parts of monomer-solvent mixture per 100 parts of latex solids, or from 30 to 200 parts of the total of alkenenitrile monomer-saturated solvent mixture per 100 parts of latex solids, is used. Preferably, an amount of such monomer-solvent mixture from 50 to 300 parts when styrene is present, on from 50 to 150 parts of the acrylonitrile-saturated solvent mixture, per 100 parts of latex solids is employed. The mixing and extraction is generally carried out at ambient temperatures, but can be conducted at from about 0° to about 80°C.

After the extraction of the graft rubber and SAN copolymer present into the monomer-solvent organic phases and formation of a separate water phase this latter water phase is separated from the organic phase. This separation or dewatering step can be carried out by any convenient means including centrifuging, decanting, filtering, or the like. Preferably, for use in a continuous process the water separation is carried out by a mechanical means which exerts pressure on the pasty or semi-solid organic phase so as to separate the water most efficiently and completely. One such suitable means is the screw separator disclosed in the copending application of R. D. Holstead and C. E. Wyman, U.S. Ser. No. 323,470 filed Jan. 15, 1973. Other mechanical means of exerting pressure upon the pasty organic and water mass may also be employed to remove the separate water phase from the organic phase. Generally, by such means one is able to separate and remove from 60 to 90 percent of the water present in the latex mixed with the monomer-solvent mixture. The most complete removal of such water at this stage is desirable in order to decrease the amount which must be removed in later stages of the process such as polymerization or devolatilization.

The organic phase which results from the extraction of graft rubber copolymer and separation of the free water phase comprises a dispersion of graft rubber copolymer particles in the monomer-solvent mixture. This organic dispersion is in the form of a paste or semi-solid. It may also be described as psuedo-plastic. The organic phase resulting from the mixing and extracting step outlined above and comprising a dispersion of graft rubber particles in the mixture of monomer-solvent comprises, on a 100 weight percent basis, from about 30 to 70 weight percent of graft rubber copolymer, from about 0.1 to 20 weight percent of uncombined or ungrafted second copolymer of monovinylidene aromatic monomer and alkenenitrile formed during the emulsion polymerization, from about 10 to 70 weight percent of the mixture of ethylenically unsaturated monomer and saturated solvent for the styrene/acrylonitrile superstrate and second copolymer and from about 0 to 40 weight percent of water. A distinct advantage of the dewatering described resides in the ability to control and predetermine the range of viscosity of such organic dispersion paste at a desired level by selection of specific saturated organic solvents and amounts thereof to be used in the monomer-solvent mixture. In general, it has been found desirable to produce an organic dispersion having a viscosity ranging from about 3,000 to 100,000 cps. For optimum dewatering in the screw separator described the dispersion desirably has a viscosity of 50,000 to 80,000 cps. Preferably, for further transfer and treatment such dispersion will have a viscosity of from about 15,000 to 50,000 cps, which can be realized by addition of monomers and/or solvent to the dewatered dispersion, as detailed below. An organic dispersion having a viscosity within the above range is easily and efficiently transferred by pumping with none of the attendant disadvantages of a very high viscosity material.

In the present invention, one prefers to disperse the organic dispersion containing the second grafted rubber continuously into the first partially polymerized mixture in step (C) forming a second partially polymerized mixture. The second mixture is then mass polymerized in step (D). The organic dispersion can be dispersed in step (C) by conventional methods such as continuously pumping into a transfer line for the first partially polymerized mixture, dispersing continuously in-line through a separate mixing vessel or adding it directly to the polymerization reactor of step (D) in Zone 2.

SECOND ZONE POLYMERIZATION OF STEP (D)

The continuous mass polymerization of the second partially polymerized mixture can be carried out by conventional continuous mass polymerization methods. Preferably, step (D) of the present invention is carried out thermally or with free radical catalysis continuous mass polymerization conducted in any of the known polymerization vessels adapted for removal of the unreacted monomers and solvents in vapor form. Most preferably, the thermal mass polymerization reaction is conducted with close control of the reaction temperature by means of removal of the monomer vapor from the reaction vessel. Any temperature controlled polymerization reaction equipment from which monomer vapor can be removed can be employed for the preferred mass polymerization step including stirred tank reactors, horizontal stirred cylindrical reactors, and other such reactors.

During the mass polymerization the saturated organic solvents present in the monomer-solvent mixture are removed along with unreacted monomers in vapor form. These vapors are then condensed and may be subjected to distillation processes for separation of a part or all of the saturated solvents present from the condensed monomers. Most desirably, the entire condensate of monomers is recycled to step (D).

Also, during the mass polymerization any water remaining in the organic dispersion phase after separation of the water phase will likewise be removed along with the monomer and saturated solvents in vapor form and will be condensed therewith. Generally, this condensed water will form a separate phase which can be decanted or drawn off from the monomers and solvents present prior to recycle thereof for further use. However, this water can be separated by distillation if the nature of the solvents or monomers present makes it desirable.

The mass polymerization reaction of step (D) can be controlled by varying the nature and amounts of the feed streams into step (A) and/or step (D) and the conditions thereof to produce the desired ABS polyblend. As is well known, it is often desirable to incorporate molecular weight regulators or chain transfer agents into the monomer formulation in relatively small quantities. Such chain transfer agents as mercaptans, halides and terpenes can be added in amounts of from 0.001 to 2.0 percent by weight if desired.

The third partially polymerized mixture of step (D) is continuously removed from the reactor and thereafter subjected to one or more stages of devolatilization to remove the remaining unreacted monomers and any remaining traces of saturated solvent or water therefrom. Such devolatilization is conducted in known manner in any desired devolatilizers, either of the wiped film or falling strand type. The devolatilization treatment is generally conducted at temperatures of from about 140° to 280°C. at reduced pressures of from 0.01 to 800 mmHg absolute, preferably at from about 180° to 250°C. and at pressures of from 2 to 200 mmHg abs. The third partially polymerized mixture can be preheated before devolatilization to reach the devolatilization temperatures desired by passing through a conventional tube and shell heat exchanger or the like. The product of the devolatilization stage is polyblend product composition substantially freed of free or unreacted monomer or monomers. Such free or residual monomer level is reduced to less than 1.0 percent by weight and desirably to less than 0.4 percent by weight.

After removal of the devolatilized polyblend from the devolatilization stage generally in the form of a melt it is formed into strands or other shapes by the use of stranding dies or other conventional means and thereafter cooled, cut or pelleted into the desired final size and stored or packaged for shipment. The final operations can all be conducted in conventional manner through the use of known equipment and devices.

Preferably, step (D) is carried out in a staged isobaric stirred reaction zone as a second reaction zone as disclosed in the copending application of D. E. Carter and R. H. Simon, U.S. Ser. No. 398,721 filed Sept. 19, 1973. The second partially polymerized mixture is polymerized by progressive multistage substantially linear flow polymerization, all said stages operating with shearing agitation and common evaporation vapor phase cooling under isobaric conditions in said second reaction zone, providing each stage with steady state polymerization at controlled temperature and interfacial liquid contact stage to stage establishing a hydraulic pressure gradient from the first stage downstream to the final stage causing substantially linear flow through said second zone, all said stages operating at predetermined conversion levels producing a composite polymer as a second polymer in said second reaction zone having a predetermined molecular weight distribution and average molecular weight maintaining the structural integrity of said dispersed rubber particle, said second zone producing a third partially polymerized mixture having a total polymer content being determined by said multistage steady stage polymerization and evaporation of said monomers.

The reactor operates under controlled isobaric conditions. The range of temperatures normally of interest for polymerizing monomer formulations comprising at least principally of monoalkenylaromatic and ethylenically unsaturated nitrile monomers in step (D) are from 130° to 200°C. The operating pressure will range from 6 to 200 psia. The polymerization reaction is exothermic, and cooling is provided primarily by vaporization of a part of the monomer from the reacting mass. Further cooling can be provided by reactor jackets. Cooling by the condensed recycle monomer feeding into the second reaction zone is also provided. The mass is in a boiling condition, and temperature is determined by the natural relationship between vapor pressure and boiling point. This relationship is also a function of the relative amounts of polymer, monomer, dissolved rubber and other substances (e.g. solvents, and additives). Since, as material progresses through this reactor, the amount of polymer continuously increases and the amount of monomer corresponding decreases via polymerization, and monomer content further decreases due to vaporation loss, the temperature progressively increases from inlet to outlet stages. To accommodate the natural swell of the boiling mass, and to provide space for vapor disengagement, the reactor is usually run at a fillage of about 10 to 90% preferably 40 to 60% of its volume.

Monomer vapor passes out of the reactor to an external condenser where it is condensed and may also be subcooled. This condensate may then be handled in several ways, for example:

1. The condensate may be returned to at least one of the staged reaction zones.
2. The condensate may be returned to the inlet compartment of the staged reaction zone and mixed with the incoming second partially polymerized reaction mixture.

In a multi-compartment staged reaction zone, each stage is well mixed, and the reaction mass is substantially homogeneous within itself. Baffles can be used to separate the stages discouraging backflow of material between compartments. Clearance between the baffles and the reactor wall does permit some backflow, and also permits the necessary net forwarding of material through the compartments from reactor inlet to outlet giving substantially linear flow.

In a substantially horizontal compartmented staged reactor as here described, the first stage has a relatively low conversion level, since it is being continuously fed by the second partially polymerized mixture of step (C). However, the rate of conversion in this stage is relatively high because of the high concentration of monomer.

In each succeeding stage, the conversion level is higher than in the preceding one, which tends to lower the rate of conversion. Offsetting this effect, however, are the facts that the temperature is higher, and that monomer is being vaporized out of the polymerizing second mixture. Thus, the total conversion to polymer obtained per unit fillage volume of the staged reactor is higher than that which could be obtained in a single stage reactor producing an equal final conversion level at equal temperature.

Clearances between rotating or stationary baffles acting as compartment baffles and cylindrical wall may be from 1% to 10% of reactor radius, the larger values being appropriate to the high conversion end of the reactor where viscosity is at maximum. Stage to stage forward flow of the polymerizing mixture is through this clearance, and vapor from the polymerizing mixture also counterflows through the clearance, above the surface level of the polymerizing second mixture.

As described above, the second partially polymerized mixture is polymerized by progressive multistage substantial linear flow polymerization with the conversion of the monomer formulation advancing from about 10–40% conversion in the first stage to 25 to 80% conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

In the initial reaction zone as the first grafted rubber particle is formed, the rubber particle has a monomer content that corresponds to the monomer content of the monomer-polymer phase. The rubber-monomer particle will stabilize at this level as the monomer polymerizes inside the rubber particle and grafted polymer is formed on the outside. Hence, the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage, less monomer is occluded in the rubber phase particle on dispersion. The second mixture is polymerized in the staged linear flow second zone, and the percent by weight of polymer being formed is progressively higher with each stage having a slightly higher polymer content. The staged linear progressive polymerization not only controls the polymerization of the monomer giving desirable polymers but preserves the integrity of the rubber particles. Although not completely understood, as the first grafted rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the first grafted rubber particle and the monomer-polymer phase at about the same rate, hence the total polymer content of the occluded monomer-polymer phase of the first grafted rubber particle is about the same as polymer content of the monomer-polymer phase and monomer is not extracted, hence the weight percent of occlusion is stabilized and remains substantially constant after formation in the initial reactor.

THE MATRIX PHASE OF THE POLYBLENDS

In the present invention, the monomer formulation comprising at least principally, a monoalkenyl aromatic monomer and an ethylenically unsaturated nitrile monomer will polymerize readily to form polymers of the matrix phase in the presence of a dispersed rubber phase. Such polymers can be called copolymers if another monomer is present in the formulation. The polymer is formed in step (A) as a free polymer or the matrix phase in the first partially polymerized mixture with at least a portion of said polymer grafted to the diene rubber forming the first grafted diene rubber.

Depending on the proportions of each monomer in the monomer formulation these polymers will have different compositions with the free polymer and the grafted polymers having about the same composition for a given formulation. It is well known that styrene and acrylonitrile monomers copolymerize in varying proportions. A monomemr formulation having about 76 parts styrene and about 24 parts acrylonitrile, e.g. will polymerize by mass polymerization with reflux of monomers to produce a polymer of this composition at any conversion because the monomers in these proportions form an azeotrope. By definition then, the azeotropic composition is the composition wherein the polymer being formed is the same as that of the unpolymerized monomer formulation. It is known that proportions other than the azeotrope above of the two monomers can be used to produce polymers of uniform composition. Basdekis, C. H. "ABS Plastics," Reinhold, New York, 1964 describes methods of producing ABS polyblends having styrene/acrylontrile S/AN matrix polymers of uniform composition using monomer formulations other than the azeotropic S/AN composition of 76/24. Muller, R. G., "ABS Resins," Report No. 20, Stanford Research Institute, Menlo Park, Cal. also describes processes for the production of ABS polyblends having uniform SAN matrix polymers. In such copolymerization, one monomer tends to enter the polymer molecule, faster than the other monomer because of their differences in reactivity. As the conversion of the monomer formulation progresses one monomer is depleted faster than the other and the monomer composition changes with conversion. The SAN matrix phase having uniform monomer composition can be produced by using (a) the azeotropic monomer formulation; (b) by keeping the monomer formulation in the reactor uniform by adjusting the proportions of the monomers charged and by (c) limiting the level of conversion so that the differential polymerization rate does not have a material effect on composition. It has been found practical in preparing uniform matrix polymers, e.g. that the 76/24 S/AN formulation can be run to about 100% conversion. The 70/30 S/AN formulation to about 75% conversion, the 35/65 S/AN and the 90/10 S/AN formulations to about 30 to 40% conversion. In mass polymerization of S/AN monomer formulations, the viscosity of the partially polymerized mixtures increase with conversion forming melts which are difficult to mix for heat transfer and homogeneity, hence conversions greater than 70 to 80% are limiting in step (D) of the second reaction zone.

The present process, then, can produce a wide range of ABS products with varying amounts of grafted rubber and matrix polymers having a wide range of monomer compositions. In addition, the two polymerization steps provide the capability of producing matrix polymers have a wide range of average molecular weights and molecular weight distributions. It is known that in thermal or catalytic polymerization that the molecular weight of the polymers can be predetermined by polymerizing at different temperatures. The lower the temperature the higher the molecular weight and conversely the higher the temperature the lower molecular weight. Step (A) is normally run at a lower temperature of 100° to 150°C. producing a first polymer having an average molecular weight of 75,000 to 200,000 Staudinger whereas step (D) is normally run at higher temperatures of 130° to 180°C. to produce a composite polymer having an average molecular weight of 20,000 to 100,000 Staudinger. By adjusting the temperature of the two reaction zones, a wide variety of matrix polymers and graft polymers can be produced to provide a final polymer with the average molecular weight desired including the molecular weight distribution desired.

As described, it is preferred to run step (D) in a staged isobaric, stirred reaction zone that has an increasing temperature for each stage producing a composite polymer in step (D) with the average molecular weight described.

Preferably, the final polymer of the matrix phase produced by the present invention has a dispersion index $M_w/M_n$), wherein $M_w$ is the weight average molecular weight and $M_n$ is the number average molecular weight ranging from about 2.0 to 4.0, most preferably from 2.2 to 3.5. The dispersion index is well known to those skilled in the art and represents the molecular weight distribution with the lower values having narrow molecular weight distribution and higher values having broader molecular weight distributions. The average molecular weight of the combined polymer of the matrix phase preferable range from 40,000 to 150,000 Staudinger.

The rubbers can be analyzed for graft and occlusions along with swelling index by the well known gel tests. The first or second grafted rubber copolymers is dispersed in tetrahydrofuran (1g/10 ml) which dissolves the polymer leaving the dispersed rubber as a gel phase. The rubber phase is separated from the dispersion by centrifuge as a gel and dried in a vacuum oven at 50°C. for 12 hours and weighed as a dry gel.

$$\% \text{ Dry Gel in Polyblend} = \frac{\text{Weight of dry gel}}{\text{Weight of polyblend}} \times 100$$

$$\% \text{ Graft and Occlusions in Rubber} = \frac{\% \text{ dry gel} - \% \text{ rubber}}{\text{Percent rubber*}} \times 100$$

*Percent rubber determined by indra-red spectrochemical analysis of the dry gel $$\text{Parts by weight of graft polymer and occluded polymer per unit weight of rubber} = \frac{\% \text{ dry gel} - \% \text{ rubber}}{\text{Percent rubber}}$$

The swelling index of the first grafted rubber can range from 2 to 40 preferably 5 to 20 whereas the swelling index of the second grafted rubber can range from 2–10, preferably 2–5.

The swelling index of the rubber graft particles is determined by taking the dry gel above and dispersing it in tetrahydrofuran for 12 hours. The gel is separted by centrifuge and the supernatant toluene drained free. The wet gel is weighed and then dried in a vacuum oven for 12 hours at 50°C. and weighed.

$$\text{Swelling Index} = \frac{\text{weight of wet gel}}{\text{weight of dry gel}}$$

The following examples are set forth to illustrate more clearly the principles and practice of this invention to one skilled in the art. They are not intended to be restrictive but merely illustrative of the invention herein described.

EXAMPLE 1

The Second Grafted Diene Rubber Preparation

Part A - Rubber Crumb

A 97/3 butadiene/acrylonitrile rubber latex having a rubber particle size of 0.20 microns is emulsion graft polymerized at 80°C. with 40 parts of a 75/25 styrene/acrylonitrile monomer mixture per 100 parts of rubber. After the reaction has reached about 96 conversion, a grafted rubber latex of 35% solids, 23.5% rubber by weight is obtained. The latex is coagulated using a 10% magnesium sulfate solution and the coagulant, washed and dried as grafted rubber crumb containing about 67% by weight rubber and 33% by weight SAN. The grafted rubber has about 30 parts by weight of graft per 100 parts of rubber, hence the rubber crumb is about 67% rubber, 20% grafted SAN and 13% free SAN.

Part B - Dewatering Procedure

The grafted rubber latex of Part A having 35% solids and 23.5% rubber is dewatered wherein 40 parts of the latex together with 2.2 parts of a 13.6% aqueous aluminum sulfate coagulant solution, 15.6 parts of acetonitrile and 9.4 parts of styrene monomer are charged to an agitated tank and stirred for 2–3 minutes. The solids coagulated entering the organic phase rising to the surface and separating from the water phase. The bulk of the water phase is drained away giving an organic phase dispersion comprising:

|  | Parts | Weight Percent |  |
|---|---|---|---|
| Solids | 14.0 parts | 36.0 | (rubber and SAN) |
| Acetonitrile | 8.6 parts | 22.0 |  |
| Styrene | 9.4 parts | 24.2 |  |
| Water | 6.9 parts | 17.8 |  |
| Total | 38.9 lbs. | 100.0 |  |

The 36 weight percent of solids provides 24 weight percent rubber and 12 weight percent SAN to the organic dispersion.

Part C - Rubber Paste Dispersion

The grafted rubber latex of Part A was metered to a mechanical screw device, for separating an organic paste phase from the water phase, along with a coagulant solution, butyronitrile solvent and styrene and acrylonitrile monomers at the rate shown below. The device employed was the screw separator disclosed and illustrated in copending application, U.S. Ser. No. 323,470 of Holstead and Wyman.

|  | lbs./hr. |  |  |
|---|---|---|---|
| Latex | 18.0 |  |  |
| Butyronitrile | 1.8 | 25% | (solvent/monomer mix) |
| Styrene | 2.7 | 37.5% | (solvent/monomer mix) |
| Acrylonitrile | 2.7 | 37.5% | (solvent/monomer mix) |
| 4% Al$_2$(SO$_4$)$_3$ Solution | 3.0 |  |  |

After separation of the water phase by the screw separator the organic paste dispersion delivered 4.12 lbs./hour of rubber and had the following composition in lbs./hr.

|  | lbs./hr. | weight percent |
|---|---|---|
| Solids | 5.58 | 41.0 |
| Water | 1.83 | 13.2 |
| Butyronitrile | 1.60 | 11.4 |
| Styrene | 2.7 | 19.4 |
| Acrylonitrile | 2.1 | 15.0 |
| Total | 13.81 | 100.0 |

Rubber content was 4.12 lbs./hr. or about 30% of the organic paste dispersion.

EXAMPLE 2

CONTINUOUS PROCESS FOR ABS POLYMERIC POLYBLENDS

A monomer formulation consisting of 2 parts by weight of stereospecific polybutadiene rubber in 98 parts by weight of a 75/25 styrene/acrylonitrile monomers is prepared by agitating the mixture at 40°C. for 8 hours. The rubber used contains approximately 35% cis-1,4 structure; approximately 55% trans-1,4 structure, and approximately 10% vinyl-1,2 structure having a Mooney viscosity of the rubber (ML-4, 212°F.) at 55 (the rubber is commercially available from the Firestone Rubber Company, Akron, Ohio under the trade name Diene 55) and 0.1 part by weight of octadecyl 3-(3', 5'-di-tertbutyl-4-hydroxyphenyl) propionate. This monomer formulation is fed continuously at approximately 145 lbs./hr. to a 100-gal. anchor-agitated initial reactor operated at approximately 50% fillage of the monomer formulation and 124°C. under 5 psig. nitrogen pressure. The agitator is approximately 31 inches wide and turns at 65 rpm. A first partially polymerized mixture containing approximately 18% SAN is pumped from the above reactor after steady state polymerization is reached at a continuous rate such as to maintain essentially constant fillage therein.

The first partially polymerized mixture is blended continuously in line with a second grafted rubber contained in an organic paste dispersion providing a second partially polymerized mixture having a total of 20 weight percent of rubber giving a ratio of a first grafted rubber to a second grafted rubber of 10/90. The second grafted rubber used has a rubber particle size of 0.20 microns, a swelling index of 4 and a graft level of 30 parts of graft to 100 parts of rubber and is mixed into the first partially polymerized mixture at a rate of 32.0 lbs./hour. The organic paste dispersion was prepared as in Example 1, Part C.

The second partially polymerized mixture is fed continuously to the second reactor, a staged isobaric stirred reactor. The second reactor has approximately a 50 gal. capacity and operates at about 40% fillage. The reactor is about 53 inches long. The agitator consists of a horizontal shaft on which are fixed a series of paddles about 2 inches wide alternating at right angles to one another. Along the shaft and rotating with it are four circular discs with an average radial wall clearance of about ⅜ inch rotating at 15 rpm. These discs are positioned to divide the reactor into five stages of approximately equal volume. The pressure in this reactor is maintained at approximately 100 psia. The third partially polymerized mixture in the final stage is maintained at about 180°C. and contains about 60 weight percent of SAN after passing through five stages, along with 20 parts of rubber and 20 parts of monomer.

The styrene/acrylonitrile vapors evaporated from the second reactor are distilled, stripping the solvent and water, and condensed and the condensate is returned to the first compartment. The evaporated monomers have a ratio of styrene to acrylonitrile of 25/75. The composition of the vapor phase is found to be in substantial equilibrium with the composition of the liquid phase under steady state polymerization and reflux. The third partially polymerized mixture is pumped continuously from the final stage at a rate to maintain essentially constant fillage in the second reactor and is delivered to the inlet of a tube and a shell heat exchanger preheater. The third partially polymerized mixture exits from the preheater at approximately 240°C. and enters a devolatilizer chamber maintained at 50 torr. The devolatilized melt is fed from the devolatilizer chamber to an extruder which forms it into a plurality of strands which are then cooled and cut into pellets.

It is to be noted that the first reactor was run at 124°C. and the second reactor at about 166°C. with the first reactor making a higher average molecular weight first polymer and the second reactor making a lower average molecular weight second polymer. The preheater of the separator step was run at 240°C. causing crosslinking of the first rubber phase giving the rubber phase a swelling index 9. Some low molecular polymer may be formed during the heating and separation steps. The combined SAN polymers of the rigid phase is found to have an average molecular weight of about 90,000 Staudinger and a dispersion index of 3.1 representative of the molecular weight distribution. The first grafted rubber particles have a desirable morphology having a particle size of 1.5 microns and having a graft and occlusion level to rubber ratio of 1.0 to 1.0. The ABS product formed has a bimodal rubber particle size distribution of first graft to second graft rubbers of 10:90 and a rubber concentration of 25% providing excellent gloss and impact strength along with other physical properties.

EXAMPLE 3

Continuous Process for ABS Polymeric Polyblends

Example 2 is essentially repeated except the second grafted rubber as prepared in Example 1, Part A, is added to the first partially polymerized mixture as a dry crumb dispersed in a styrene/acrylonitrile monomer mixture. Here the styrene and acrylonitrile monomers evaporated from the staged isobaric stirred ractor (SISR) are condensed and cooled to about 35°C. having a ratio of styrene/acrylonitrile of 25/75. The rubber crumb disperses readily in said monomers up to about 40 weight percent. Said mixture is charged to provide about 32 lbs./hr. of rubber of 18 weight percent to the first partial polymerized mixture as it enters the SISR zone. The styrene/acrylonitrile monomer-rubber dispersion has a balance of monomer to rubber to insure a rate of return of monomer to the SISR zone consistent with rate evaporated for cooling purposes. At steady state polymerization then there is no net add of monomers to the SISR zone and the second grafted rubber is transferred through the recycle monomers and mixed with the first polymerization mixture as it enters the SISR zone.

The polymeric polyblend formed had properties similar to that of Example 2. The first grafted rubber has a particle size of 1.45 microns having a graft and occlusion polymer level to rubber ratio of 1.0 to 1 and a swelling index of 11. The rigid phase of the polyblend had a Staudinger molecular weight of 91,000 and a dispersion index of 2.9. The polyblend has a bimodal rubber particle size with a ratio of first grafted rubber to second grafted rubber of 10 to 90 and a rubber content 25% providing excellent gloss, impact strength and other physical properties.

EXAMPLE 4

The procedures and equipment of Example 2 were used except that 10 parts by weight of the stereospecific polybutadiene rubber was dissolved in 90 parts by weight of a 75/25, S/AN monomer mixture and charged continuously to the reactor operating under the conditions of Example 2. The first polymerized mixture is pumped from the initial reactor and mixed with a S/AN monomer mixture in line using a static pipe mixer (Kenics). The mixer is commercially available and commonly used for in line mixing of fluids wherein the fluids pass through a elongated pipe zone having stationary helical elements. The first partially polymerized mixture and the monomer mixture are proportioned through a Y-type interconnecting pipe arrangement into the static pipe mixer giving good mixing to provide a diluted first partially polymerized mixture. Only mild mixing is needed and subsequent runs using a simple T or Y-type interconnecting pipe arrangement provided adequate mixing for transfer to the second reactor zone. Under steady polymerization conditions and 30% conversion the initial reactor is charged with a 10% by weight rubber solution at a rate of 20 lbs./hr. and a partially polymerized mixture withdrawn at 29 lbs./hr. The mixture is diluted with a 75/25, S/AN monomer blend proportioned into the mixture at 116 lbs./hr. to provide a dilution factor of 5 and a rubber content of about 2% by weight in the diluted first partially polymerized mixture. The mixture is fed to the second reaction zone at 145 lbs./hr. The process is then followed to completion as in Example 2 giving a polymer polyblend having excellent gloss, impact strength and other physical properties.

Dilution Step

The mode of operation as shown in Example 3 has the advantage of allowing the process to use a smaller initial reactor and prepare the first grafted rubber at higher percentage of rubber which can be diluted providing the polymeric polyblend with small amounts of the larger type of rubber particle. It is also an embodiment of the present invention to use a large initial reactor preparing high percentages of the first grafted rubber feeding several second reactors the desired amount of large rubber particles in diluted form.

What is claimed is:

1. In a continuous mass polymerization process for preparing a polymeric polyblend, the steps comprising:
   A. continuously mass polymerizing monomers containing 0.1 to 15% by weight of a soluble diene rubber so as to convert 10 to 40% of said monomers to a polymer, graft at least a portion of said polymer on said diene rubber and disperse said rubber as a first grafted diene rubber-monomer phase in a monomer-polymer phase, to provide a first partially polymerized mixture, said monomers comprising at least principally a monoalkenylaromatic monomer and an ethylenically unsaturated nitrile monomer, said first grafted diene rubber-monomer phase being dispersed by shearing agitation of said first partially polymerization mixture, as rubber-monomer particles having an average particle size of 0.7 to 10 microns and having present occluded and grafted polymer;

B. continuously withdrawing said first partially polymerized mixture from step (A);

C. continuously dispersing a second grafted diene rubber into said first partially polymerized mixture, said second grafted rubber comprising crosslinked rubber particles having a swelling index of at least 2, an average particle size of 0.01 to 0.5 microns and being grafted with about 0.1 to 2.5 parts of said monomers per 1 part of rubber forming a second partially polymerized mixture containing 1 to 30 weight percent of said first and second grafted diene rubbers wherein the second grafted rubber comprises from about 50 to 97% of the total weight of said first and second grafted diene rubbers;

D. continuously mass polymerizing said second partially polymerized mixture under shearing agitation until the polymerization of said monomer formulation has reached a conversion of about 25 to 80% to provide a third partially polymerized mixture;

E. continuously devolatilizing said third partially polymerized mixture to provide a polymeric polyblend comprising about 2 to 40% by weight of said first and second grafted diene rubbers wherein said second grafted diene rubber comprises about 50 to 97% of the total weight of said first and second grafted diene rubbers, the remainder up to 100%, being polymer of said monomers, said first grafted diene rubbers being dispersed as rubber particles having an average particle size of 0.7 to 10 microns, a swelling index of at least 5 and having present occluded and grafted polymer in an amount of about 1 to 5 parts per each part of rubber.

2. A process of claim 1, wherein said monoalkenylaromatic monomer is styrene, said ethylenically unsaturated monomer is acrylonitrile and said diene rubber polybutadiene.

3. A process of claim 1, wherein said monoalkenyl aromatic monomer is styrene.

4. A process of claim 1, wherein said ethylenically unsaturated nitrile monomer is acrylonitrile.

5. A process of claim 1, wherein the said monoalkenylaromatic monomer and said ethylenically unsaturated nitrile monomer comprise at least 75% by weight of said monomers.

6. A process of claim 1, wherein said diene rubber of the first and second grafted is butadiene, butadiene-styrene, butadiene-acrylonitrile, butadiene-styrene-acrylonitrile, chloroprene, chloroprene-butadiene, chloroprene-styrene, chloroprene-acrylonitrile, chloroprene-styrene-acrylonitrile and mixtures thereof.

7. A process of claim 1, wherein the diene rubber of said first and second grafted rubber contains at least 50% by weight of a conjugated 1,3 butadiene monomer moiety.

8. A process of claim 1, wherein said soluble diene rubber of said first grafted rubber is polybutadiene having a cis isomer content of about 30 to 98% and a Tg range of from about −50°C. to −105°C.

9. A process of claim 1, wherein said first and second grafted rubbers of step (E) have a swelling index of about 2 to 50.

10. A process of claim 1, wherein the polymer formed has an average molecular weight of from about 40,000 to 150,000 Staudinger.

11. A process of claim 1, wherein the polymerization of step (A) is conducted at temperatures of about 100° to 150°C. under superatmosphere pressure with shearing agitation.

12. A process of claim 1, wherein the polymerization of step (A) and (D) are carried out with said monomer formulation having present about 0.001 to 3.0 percent by weight of a free radical generating catalyst.

13. A process of claim 1, wherein said free radical generating catalyst is selected from the group consisting of di-tert-butyl peroxide, tert-butyl peracetate, benzoyl peroxide, lauroyl peroxide, tert-butyl perbenzoate, dicumyl peroxide, tert-butyl peroxide and isopropyl carbonate or mixtures thereof.

14. A process of claim 13, wherein said free radical generating catalyst is tert-butyl peracetate.

15. A process of claim 13, wherein said free radical generating catalyst is di-tert-butyl peroxide.

16. A process of claim 1, wherein the continuous mass polymerization of step (D) is conducted at temperatures of 130° to 180°C.

17. A process of claim 1, wherein the polymerization of step (D) is controlled thermally by evaporating and removal of said monomers under isobaric conditions and shearing agitation.

18. A process of claim 17, wherein the evaporated and removed monomers are liquified and returned to the polymerizing partially polymerized second mixture at a rate such that steady state polymerization is maintained.

19. A process of claim 17, wherein the polymerization of step (D) is conducted progressively under substantially linear flow through 2–15 polymerization stages, said stages operating under substantially constant gravimetric fillage of from about 15 to 90% of their volume of said polymerizing second partially polymerized mixture.

20. A process of claim 19, wherein the evaporated and removed monomers are liquified and returned to at least one polymerization stage at a rate such that steady state polymerization is maintained.

21. A process of claim 20, wherein the evaporated and removed monomers are liquified and returned to the first polymerization stage.

22. A process of claim 1, wherein said devolatilizing of step (E) is carried out at temperatures of about 200° to 250°C. under a subatmospheric pressure.

23. A process of claim 22, wherein said first grafted rubber is crosslinked in step (E) to a swelling index of at least 5.

24. A process of claim 1, wherein the second grafted diene rubber dispersed in step (C) is contained in a mixture comprising on an 100% weight percent basis, from about 30–60 weight percent of said second grafted diene rubber; about 0.1 to 20 weight percent of said polymer; about 20 to 70 weight percent of said monomer and a saturated solvent and from about 0 to 40 weight percent of water, said second grafted diene rubber having a swelling index of at least 2, said first and said second grafted rubbers being present in said second partially polymerized mixture in an amount of from about 1 to 30 weight percent wherein said second grafted rubber comprises about 50 to 97% of the total weight of said first and second grafted rubbers.

25. A process of claim 1, wherein the second grafted rubber dispersed in step (C) is contained in a mixture of said monomers; said monoalkenylaromatic monomer and said ethylenically unsaturated nitrile monomer comprising at least 75% by weight of said monomers.

26. A process of claim 25, wherein said ethylenically unsaturated nitrile monomer constitutes at least about 50% by weight of said monomers.

27. A process of claim 25, wherein the second grafted rubber is contained in said monomers in an amount of from about 1 to 40 weight percent of said monomers.

28. A process of claim 1, wherein step (B) includes withdrawing said first partially polymerized mixture from step (A) and adding said monomers in an amount sufficient to adjust the weight percent of the first graft rubber to a predetermined weight percent less than that contained in the first partially polymerized mixture forming a diluted first partially polymerized mixture.

29. A process of claim 28, wherein said monomers are added in about the same proportions as contained in the first partially polymerized mixture.

* * * * *